Aug. 3, 1954     H. AUGER     2,685,377

POWER TRANSMISSION MECHANISM

Filed May 28, 1948     10 Sheets-Sheet 1

Fig. 4.

Aug. 3, 1954    H. AUGER    2,685,377
POWER TRANSMISSION MECHANISM
Filed May 28, 1948    10 Sheets-Sheet 3

Fig. 5.

INVENTOR
Harold Auger
by Walter S. Hinton
ATTORNEY

Aug. 3, 1954  H. AUGER  2,685,377
POWER TRANSMISSION MECHANISM
Filed May 28, 1948  10 Sheets-Sheet 4

INVENTOR
Harold Auger
by Walter S. Pleston
ATTORNEY

H. AUGER 2,685,377

POWER TRANSMISSION MECHANISM

Filed May 28, 1948

INVENTOR
Harold Auger
by Walter S. Pleston
ATTORNEY

Aug. 3, 1954  H. AUGER  2,685,377
POWER TRANSMISSION MECHANISM
Filed May 28, 1948  10 Sheets-Sheet 7

Aug. 3, 1954    H. AUGER    2,685,377
POWER TRANSMISSION MECHANISM
Filed May 28, 1948    10 Sheets-Sheet 9

INVENTOR
Harold Auger
by Walter S. Pleston
ATTORNEY

Patented Aug. 3, 1954

2,685,377

UNITED STATES PATENT OFFICE 2,685,377

POWER TRANSMISSION MECHANISM

Harold Auger, Maidenhead, England

Application May 28, 1948, Serial No. 29,913

Claims priority, application Great Britain
June 3, 1947

18 Claims. (Cl. 214—16.1)

The present invention relates to power transmission mechanisms and the employment thereof for moving a load from one position of rest to a second position of rest at a distance from the first, more particularly as applied to the successive movements of the platforms in mechanical storage equipment of the kind in which motor cars or the like are circulated on such platforms.

A principal object of the invention is to modify and improve the drive modulating mechanism set forth in the specification of my prior application for patent Serial No. 718,737, filed December 27, 1946, in order that its weight may be considerably reduced and also, by enabling the mechanism to be operable in a generally horizontal plane instead of a generally vertical one, to make possible a great saving in the depth required to house it and to render choice of its acceleration and displacement characteristics independent of its depth.

An ancillary object is to enable cable to be used as the flexible band of the modulating mechanism and also for driving it.

In the case of the storage equipment, the main object of the invention is to enable the novel characteristics of the developed drive modulating mechanism according to my present proposals to be used to fullest advantage in the equipment according to my aforesaid prior specification both in driving the ranks of platforms as well as in traversing the platforms between the ranks, so that the depth of the equipment can be reduced if desired to no more than that of the platform track rails and their supporting sleepers without calling for anything in the nature of a pit in the foundation for housing the drive mechanism.

A further object is to enable the driving of the whole equipment to be carried out as completely as possible from a particular section, preferably the middle part of the rank trackways.

According to the present invention, the flexible band of the drive modulating mechanism takes the form of a flexible metering band which has connections both to the load and to a relatively fixed anchor, and a portion of the band is looped or wrapped about a mobile member (sometimes called a deflector) which establishes the shape of the loop or bight portion of the band. A coupling fixed on the metering band constitutes one of such connections. As the deflector moves translationally under the restraint of another of such connections, which acts upon the deflector by way of the band, the coupling and the metering band are constrained to follow a path which is defined on the deflector and which has a directional component transverse to the direction in which the deflector moves, and displacement of the load occurs through the connection between the load and the band. A mobile member in the form of a chassis or frame having an endless flexible band passing around it to provide a carriage adapted to be rolled along a track according to my aforesaid prior specification can thus be replaced by an anchored metering band looped around a mobile deflector able to cause displacement of the loop along the band whilst maintaining the said loop sufficiently taut and its shape in substantial conformity with that of the deflector throughout the travel of the latter, whereby the metering band together with the connection which is adapted to be coupled to the load may be caused to pass around the mobile deflector as the latter is moved in the direction in which the load is to be displaced, thereby to bring about such displacement.

The metering band of the present invention need not be endless, but merely requires to be attached to one or more anchorages. Although, as in the case of the track of my aforesaid prior specification, it is possible to arrange for this anchorage or these anchorages to move with the load, and to restrain the coupling on the metering band from translatory movement in the direction of the load's movement, it is preferred to fix the said anchorage or anchorages and to connect the load to the said coupling. The metering band may therefore be fixedly anchored as to a framework at one or both its ends, or secured to one fixed anchorage and to a winding drum.

The characteristics of the motion imparted to the load according to the present invention are in no way different from those set forth in my aforesaid prior specification. Thus a simple cycloidal type of motion results from using a circular deflector whilst the additional advantages already fully discussed in that specification can be obtained if the deflector is adapted to hold the loop elongated in the general direction of its movement, as by passing it around a deflector comprising two sheaves or pulleys which lie in the same plane and have their axes spaced apart in that direction.

The fixed limits of the coupling beyond which travel of the deflector causes no further effective displacement of the said coupling, are capable of accurate determination by the length of the metering band between the said coupling and the anchorage or anchorages of the said band. Although cable is preferably used both as the metering band and also for driving the deflector, chain could be employed instead, providing the lay-out is such that the circumstance that the flexible band cannot lie in one plane does not result in undue distortion.

Driving band or cable around and between fixed-centre end sheaves or the like (one of which may be a winding drum) located beyond the limits of travel of the deflector may be used for reciprocating the latter. Various such lay-outs are possible, and mechanical advantage can be obtained by lapping the band or cable around the deflector or part thereof. In certain cases the metering cable can itself be used in driving the deflector. This is true in both directions of travel if the deflector is self-powered, being provided with a winding drum operating on the metering cable, in which circumstances no separate driving cable is required.

The deflector according to the present invention can be disposed generally horizontally, so that it can be arranged flat in association with a reciprocable so-called collector which is similarly disposed, the coupling on the metering cable being connected to the collector preferably through a link pivoted to the underside of the collector and arranged to swing horizontally, although an equivalent pin and slot connection could be substituted for the pivotal linkage if desired. Both the pivoted link and the pin-and-slot connection will be recognized, of course, as two well known mechanisms for imparting to one body a desired projection or component of the motion of another body, and such mechanisms may be referred to as projection drives. The horizontal arrangement of deflector and collector enables the diameter of the sheaves or equivalent curved parts of the deflector, by which the acceleration and displacement characteristics of the mechanism are determined, to be chosen without regard to depth, since they will, in such an arrangement, only affect the width of the mechanism. It is desirable to support the deflector throughout its travel between side rails and for the collector to be similarly supported. A runway of this kind for the collector may be disposed in a plane above that of a runway for the deflector.

A yet further saving in the depth of the drive modulating mechanism according to the present invention can be achieved by accommodating the deflector within the overall thickness of the associated collector. In this connection it should be noted as desirable to support a deflector as herein disclosed throughout its travel between side rails, and for the collector to be similarly supported. The respective runways of the deflector and collector may be disposed in the same plane with the collector straddling the deflector. Preferably the collector itself provides the runway of the deflector, it then being only necessary for it to accommodate the differential displacement which takes place between them during the course of their travel.

A subsidiary feature of the invention is the special trunnion block used at the aforesaid coupling point between the metering band and the load, whereby the connection with the band allows of accurate registration of the axis of the coupling with the axis of the band throughout their passage around the deflector.

In applying the present drive modulating mechanism to the actuation of the ranks of the storage equipment set forth in my aforesaid prior specification, the deflector may be caused to move lying flat within the depth of the sleepers by which the platform track rails are supported and a collector may be disposed above it, generally on a level with the platform. Whilst it would be possible for both collector and deflector of such a rank shifting drive to operate in the same plane as already described, i. e. that of the platforms and their tracks, this would in practice be an unnecessary refinement having regard to the requirements of other parts of the equipment. The deflector of the rank shifting drive may be operated through a driving band from a winding drum alongside the ranks.

The coplanar arrangement of collector and deflector is especially useful where the drive modulating mechanism is required to be disposed transversely of two main parallel ranks of platforms for operating the traversing means of cross-overs whereby platforms are transferred between the ranks, since in these circumstances the mechanism has to be accommodated beneath the platform track rails and preferably within the depth of the sleepers thereof. A single prime mover may be used to operate such a transversely disposed drive modulating mechanism in phase with the coupling means of the collectors in the respective ranks, a convenient location for the said mechanism being between coupling stations which are displaced along the ranks from the drive modulating mechanisms of the latter.

The invention will now be described by way of example with reference to the accompanying drawings whereof:

Figures 12a–d are a series of diagrams showing typical relative positions assumed by the deflector and collector of Figures 10 and 11 during the course of their travel; whilst Figures 13a–c are plan, side elevation and end elevation respectively of the cable trunnion block used for pivotally connecting the collector link to the cable in such a way as to permit the connection to pass around the sheaves of the deflector carriage, the respective elevations being in the direction of the arrows b—b and c—c of Figure 13a.

Figure 1:
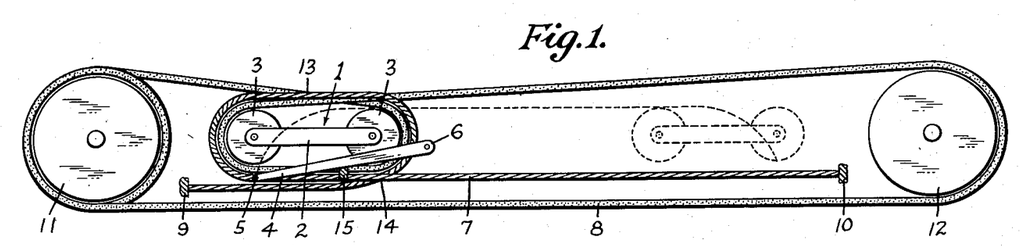
Figure 1 shows diagrammatically one form of drive modulating mechanism according to the invention.
Figure 2:
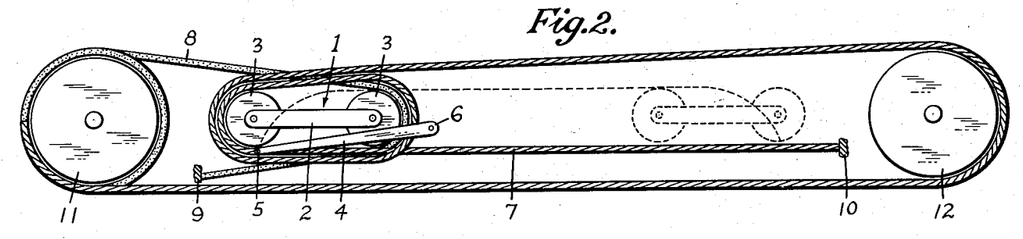
Figure 2 is a similar view of an alternative form.
Figure 3:
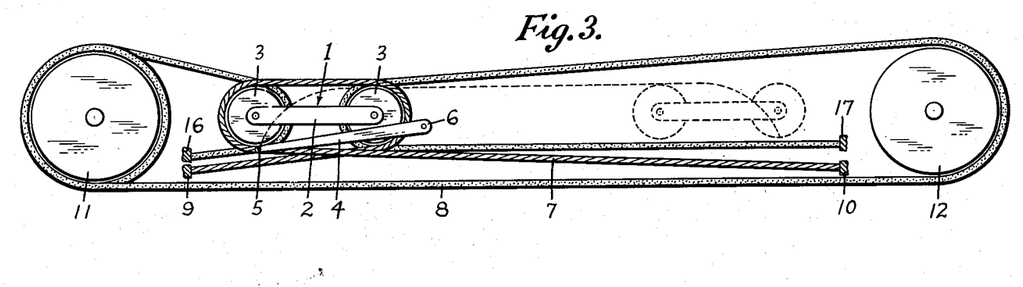
Figure 3 being a similar view of another alternative.

In the mechanisms shown in all of Figures 1 to 3, the modulating deflector 1 shown in full lines at the left hand limit of its traverse, consists of a frame 2 and two spaced sheaves 3. This deflector is disposed flat beneath a collector, to which the load is coupled, and which is not shown in these figures except for the horizontally swinging link 4 by which it is coupled at one end 5 with the flexible metering cable, the other end 6 of the link being pivoted to the underside of the collector plate. The position of the deflector at the far right end of its travel and the flat top cycloidal path traced out by coupling 5 are shown in dotted lines. The metering cable 7 which is looped around the deflector 1 is shown cross-hatched, whilst the driving cable 8 is shown stippled. Two fixed cable anchorages 9 and 10 are provided substantially in line with one another alongside the path of the deflector 1, these anchorages being spaced apart sufficiently to permit of the required travel of the latter, i. e. at least a distance equal to that between the end limiting positions of the coupling 5 less twice that between the centres of sheaves 3, although the spacing should preferably be greater to allow the deflector to overrun at either end. Another feature which is common to the arrangements of Figures 1 to 3 is the provision beyond one end limiting position of the deflector 1 of a powered fixed-centered winding drum 11 for the cable and a jockey sheave 12, which is also fixed-centered, beyond the other end limiting position. Since it is desirable for cable which is intended to be driven by drum 11 to be fixed thereto in order that the drive may be positive, the attached part of the cable can never leave the drum, so that sufficient turns around the latter must be provided to cover the travel of the deflector, cable being payed out to one side of the drum as it accumulates to the other.

It will be understood that as the deflector moves translationally to the right, from the position shown in solid lines in Figs. 1–3 to the position shown schematically in dotted lines in the same figures, metering cable 7 circulates around the deflector and coupling 5 moves in a path defined by the loop or bight of cable 7 which is wrapped around the deflector, coupling 5 first moving around the left end of the deflector, then along its top (that is, the top as seen in Figs. 1–3), and finally around the right end of the deflector to the position indicated at the right end of the dotted flat-top cycloidal path in Figs. 1–3. It will thus be seen that as coupling 5 moves along the loop path, it has a component of motion that is transverse to the directions in which the deflector and load move (the load being represented by the collector, which is drivenly connected to the load), and that the swinging link 4 accommodates such transverse movement of the coupling and imparts to the load only a projection of the complete motion of the coupling.

In the Figure 1 arrangement, the metering cable 7 is attached at either end to the respective anchorages 9 and 10, having merely to be long enough to lap completely around the deflector and form the required displaceable loop or bight. By also lapping the driving cable 8 around the deflector so that the resulting crossing at 13 lies on the opposite side thereof to the crossing 14 of the metering cable 7 and coupling the cables together at 15, a convenient point along their length where they never separate, but always both remain on the deflector, a substantial mechanical advantage can be obtained. The pull on driving cable 8 derived from winding drum 11 when rotated one way, acts directly on the deflector to cause it to travel towards the drum. When rotated the other way however, the drum acts on the deflector indirectly around the jockey sheave 12 to cause the deflector to travel away from the drum. The lengths of metering cable 7 which extend from the deflector to the respective anchorages, provide reaction against these winding pulls according to the direction in which they operate.

The Figure 2 arrangement differs mainly in that the metering cable 7 is also used as a driving cable, in one direction of travel of the deflector, i. e. away from the winding drum, what for convenience may still be referred to as the driving cable 8 (since it performs no other function) being used for moving the deflector towards the drum. One end of the metering cable is secured to anchorage 10 remote from the winding drum. From this, the said cable is lapped around the deflector, but instead of thence passing to the other anchorage it is taken around the opposite side of the deflector back to the jockey sheave 12 and thence to a fixed connection with the winding drum. Rotation of the latter to wind in cable 7 thus acts indirectly on the deflector. Cable 8 is secured at one end to anchorage 9 nearest the drum and passes thence around the opposite side of the deflector back to a fixed connection with the winding drum, so that rotation of the drum the other way to that just mentioned acts directly to draw the deflector towards it. As in the first arrangement, the lengths of cable extending from the deflector to the respective anchorages provide reaction against the winding pulls in either direction.

In the case of the Figure 3 arrangement, the metering cable 7 is of the same simple form as in Figure 1 and plays no part in driving the deflector. However, the arrangement of the driving cable is different, its ends being anchored independently at 16 and 17, conveniently adjacent the metering cable anchorages 9 and 10 respectively. From each of these anchorages 16 and 17 the driving cable passes around the near sheave of the deflector back respectively to the winding drum 11 and the jockey sheave 12. This arrangement enables the metering and driving cables to be entirely separated and made independently adjustable.

In all these examples, the winding drum 11 may be formed with helical grooves to accommodate the lengths of cable liable to become wound onto it whilst the jockey sheave 12 and deflector sheaves 3 should also be grooved to take the cables passing around them. It should be noted in this connection that where Figures 1 to 3 show cables superimposed around the deflector sheaves, this is only for convenience of illustration. The axial length of the drum can be minimized to suit the reduced depth of the rest of the mechanism, if the lengths of driving cable are secured adjacent the ends of the drum, so that both lengths make use of the same intermediate helical groove, the one being wound out of it as the other is being wound into it and vice versa. In this way the length of the drum can be halved as compared with the arrangement in which the cable is secured to a mid-point of the groove to be wound outwardly therefrom in both directions. The fixed anchorages 9, 10, 16 and 17, should preferably permit of adjustment, e. g. to take up any stretch in the cable or cables, so that the setting of the limiting positions of the deflector may be adjusted, and in particular those of coupling 5 accurately determined. If desired, the precise location of the terminal positions of the coupling may be ensured by causing it to engage stops at either end of its travel.

It will be appreciated that using a metering cable as in Figures 1 and 3, other alternative methods of driving the deflector are possible. For instance, this may be effected by attaching the deflector to a reciprocable cable or chain as in the case of the modulator carriage according to my aforesaid prior specification. Again the deflector may be self-powered by means of a winding drum associated and moving therewith and operating on the metering cable. If sufficient turns of such cable around the winding drum are desired to enable the cable to be attached to the drum for the purpose of securing a positive drive as already described, it will be necessary to arrange for coupling 5 to be on a part of the cable which is not liable to become wound around the drum (as distinct from lapping the deflector in case the winding drum also serves as a deflector sheave).

It will be apparent from a study of Figures 1 to 3 that a circular deflector 1 can readily be substituted for that shown if a simple cycloidal curve without flat top characteristics for coupling 5 is all that is wanted.

It is desirable to support the deflector throughout its movement between rails which may be of inwardly facing channel formation to take rollers projecting laterally from the deflector frame. It is also desirable for the associated collector to be similarly supported. The manner in which this can be done is fully described in relation to the storage or vehicle parking equipment next to be described.

Reference may be made to my aforesaid prior specification for particulars of the general modus operandi of the equipment shown in Figures 4 to 13 and next to be described with particular emphasis on those respects in which the present equipment differs from my earlier proposals. This equipment constitutes part of a two-rank circulating-loop storage circuit in which the loads, such as automobiles or other vehicles, are supported on pairs of wheeled platforms which are moved longitudinally on tracks extending along the ranks, and at the ends of the ranks, i. e., in the end crossovers, are moved sidewise from one rank to another. Such a storage circuit may operate with a single empty vehicle space ("single open space working") or with two empty spaces ("double open space working"), with corresponding characteristic differences in the pattern of the circulation cycle and the speed of circulation.

Figure 4:
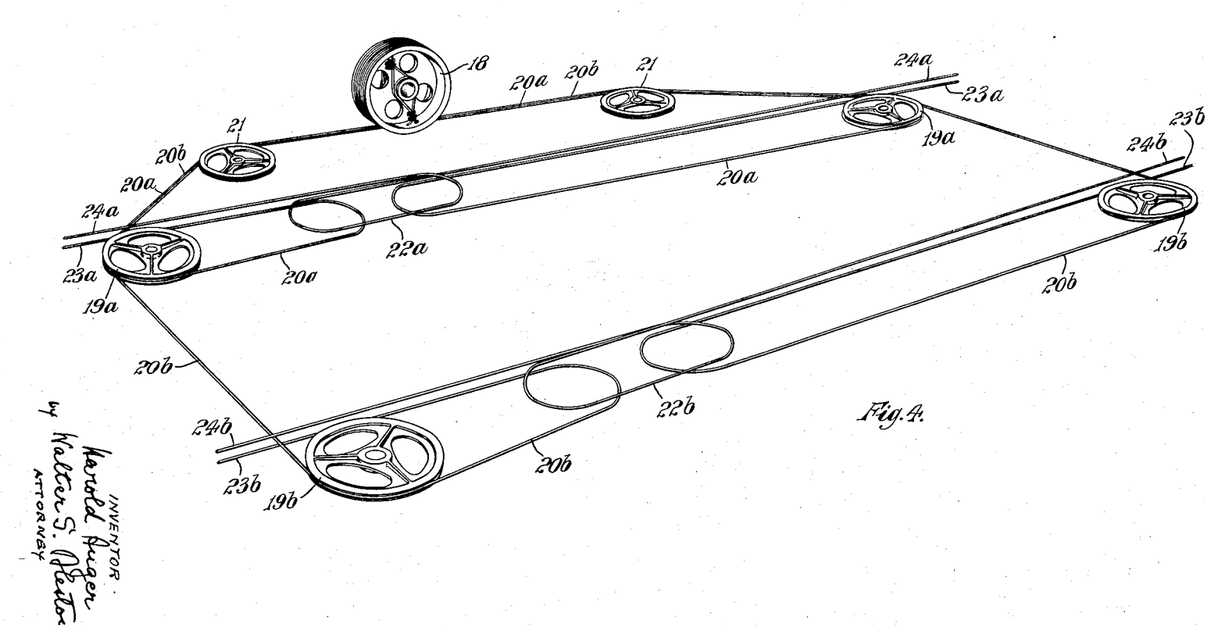
Figure 4 is a perspective view of the deflector cable layout and common drive for shifting platforms in two main ranks of a storage or vehicle parking equipment according to the invention.

The cable lay-out shown in Figure 4 is intended for single open space working of the two ranks of platforms for which purpose the modulating deflectors of both ranks are required to be moved simultaneously in the same direction, one loaded and the other unloaded. In this figure it will of course be appreciated that the deflectors are not included, the cables being, however, shown looped as if around the deflectors. The principle of this lay-out is basically the same as that of Figure 3 already described, but instead of the deflectors each having its own winding drum a single such drum 18 is employed, conveniently located to the side of the ranks of platforms and common to both ranks.

Accordingly, at either end of each modulating mechanism it is possible to use plain fixed axis jockey sheaves 19a and 19b around which the respective driving cables 20a and 20b pass, sheaves 21 alongside the ranks being used for guiding both cables to the end sheaves 19a of the adjacent modulating mechanism, which latter sheaves are in turn also used for guiding cable 20b to sheaves 19b of the other modulating mechanism. The metering cables of the respective mechanisms are denoted by 22a and 22b. As already described in connection with Figure 3, the ends 23a and b of the respective driving cables and those 24a and b of the respective metering cables go to adjustable fixed anchorages which are not shown.

Figure 5:
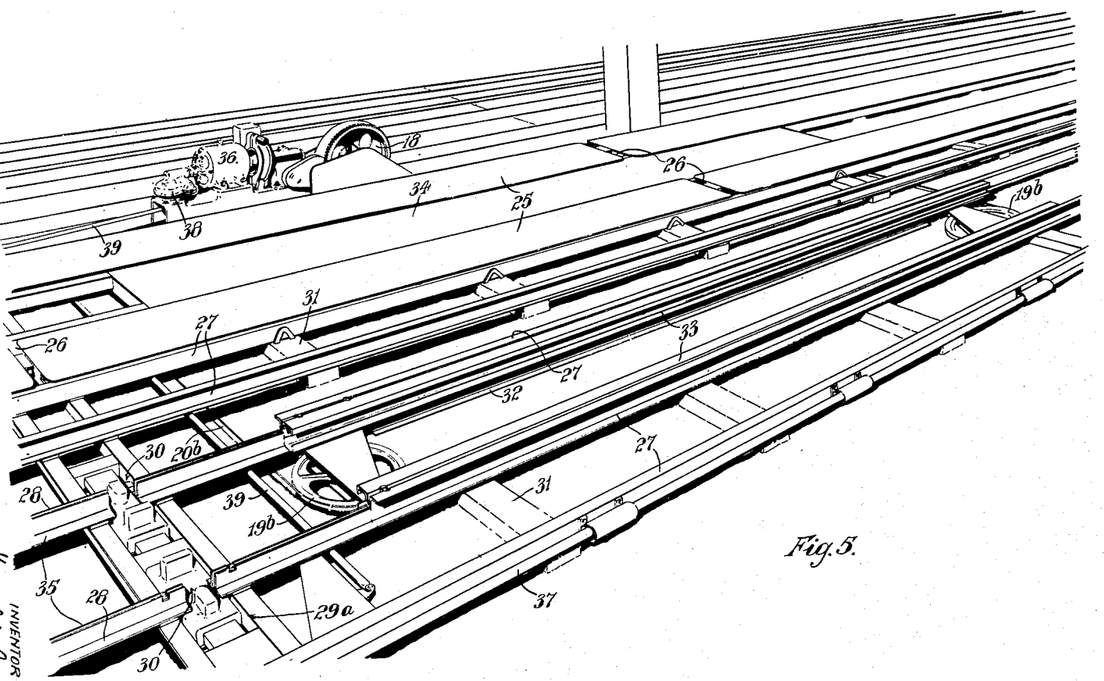
Figure 5 is a perspective view of that part of the equipment occupied by the cable lay-out of Figure 4 showing the platforms of the far main rank in situ but the travelling parts removed in the near main rank in order to reveal the platform tracks and associated parts.

In Figure 5 the track parts are drawn assembled around the cable lay-out of Figure 4 but still omitting in the open near side rank not only the deflector but also the cable which is looped around it (as it appears in Figure 4), the collector and associated coupling members. The actual track is not significantly different from that fully described in my aforesaid prior specification although naturally it has been adapted in detail to suit the modifications in the various travelling parts for which it is intended. The platforms of each main rank are, as before, associated in pairs arranged in subordinate ranks. As can be seen in the far side main rank of Figure 5, the individual platform units 25 have continuous plain top bearing surfaces instead of gratings. Another difference lies in using the spaces 26 between adjacent platform ends for drive coupling purposes instead of providing the platforms with side jaws for this purpose. Normal section track rail for the platform rollers is indicated at 27. At 28 the inner rails of each main rank are modified as in my earlier construction to permit the passage over them of an outwardly spread pair of trigger links between spaced coupling stations, the near one 29a of which appears in Figure 5, the breaks 30 in the track rails at this station being clearly shown. The track rails are raised from the foundation supported on sleepers 31 sufficiently to permit the deflectors to be accommodated beneath them, including the transverse modulating mechanism to be described later, and operational parts of the end cross-overs with which the present invention is not concerned. In each main platform rank, supplementary rails 32 are provided beneath the inner track rails over the length covered by the reciprocation of the deflector in the space between the two subordinate ranks, the deflector carriage having rollers for engaging these supplementary rails as will be described in connection with Figure 7. The fixed axis sheaves 19a and 19b of the respective modulating mechanisms of which sheaves 19b appear in Figure 5 are also disposed beneath the level of the track rails 27 in the plane of rails 32 and of the deflector carriage. Above rails 32 and extending sufficiently beyond them to cover its greater travel, are rails 33 for the collector carriage which is thus able to reciprocate above the associated deflector carriage, itself substantially on a level with the platforms, within a casing the top 34 of which is shown for the far main rank. Continuous with rails 33 rails 35 provide the necessary runways between the spaced coupling stations for the depending pins on the trigger arms or links 52 associated with the collector carriage when withdrawn from engagement with the platforms as fully explained in my aforesaid prior specification. Before passing on from Figure 5, attention is called to the motor 36 used to drive the winding drum 18. Although not pertinent to the present invention, it may nevertheless be remarked in passing that the same motor is also employed to set the end cross-overs (an operation which can conveniently be carried out simultaneously with that of the rank modulating mechanisms) by reciprocation of side tubes 37 of which the near one is shown in Figure 5 through a suitable gearing 38 and linkage 39.

Figure 6:
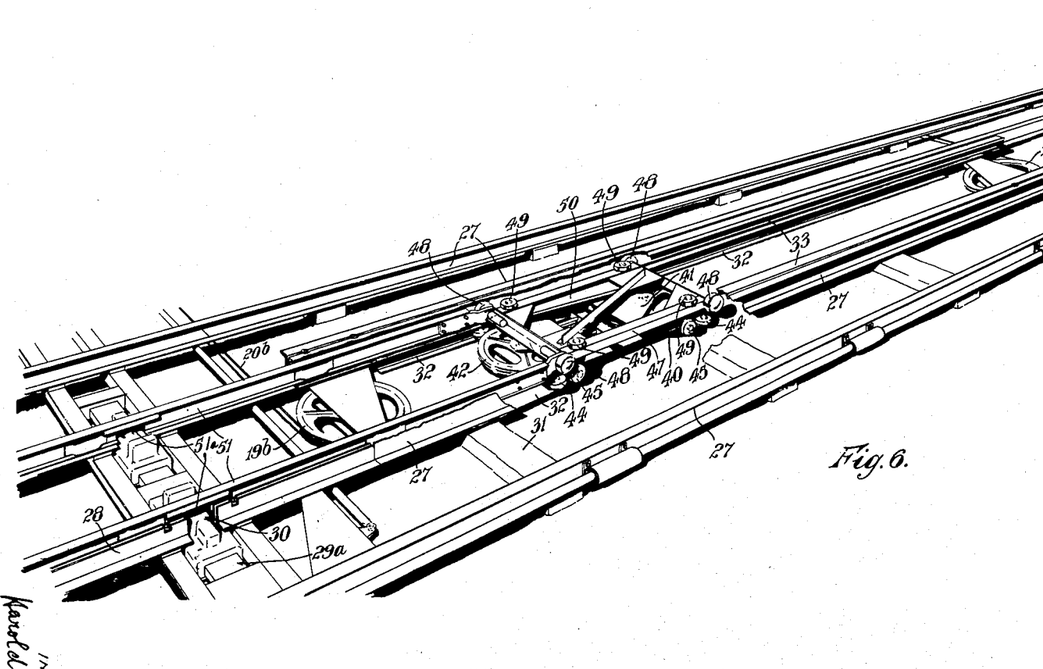
Figure 6 is a perspective view corresponding to Figure 5, but showing only the near main rank with the deflector and collector carriages and associated parts in position, the track and other rails being broken away as required.
Figure 7:
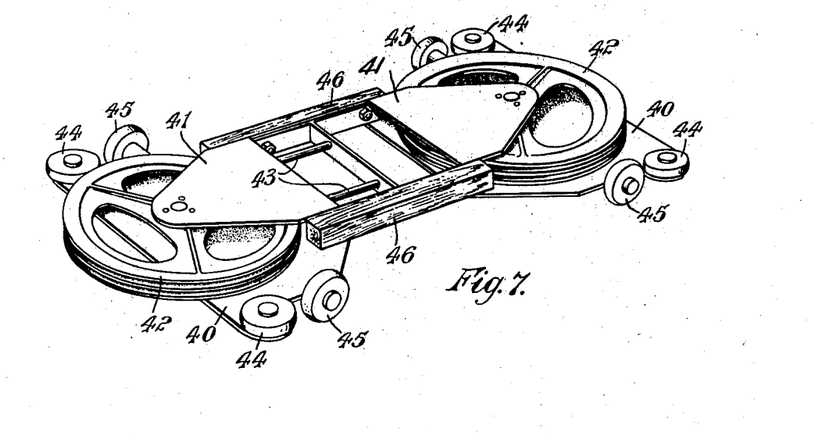
Figure 7 is a perspective view showing just the deflector carriage of Figure 6 wherein it is largely hidden by the collector carriage above it.

In Figure 6 the near side deflector carriage is shown in place in engagement with rails 32 and with the associated collector carriage over it in engagement with rails 33. A better idea of the deflector carriage can be gained from Figure 7, from which it will be seen that it comprises a framework arranged in a generally horizontal plane and within the depth of the webs of rails 32. Between pairs of plates 40 and 41 at either end of the carriage are rotatably mounted sheaves 42, the distance between the centres of these sheaves being adjustable by means associated with rods 43. On the lower plates 40 are pairs of rollers 44 on vertical axes to engage the webs of rails 32 for lateral support and running rollers 45 for engagement with the rail flanges. The wooden runners 46 are to support the trunnion block of the collector link (to be described later) in passing from one sheave to the other. Returning to Figure 6, the collector carriage must next be described. This consists of a simple frame 47, horizontally disposed within the depth of the webs of rails 33. It is provided with running rollers 48 on horizontal axes and lateral thrust rollers 49 on vertical axes, similar to those of the deflector carriage. Beneath frame 47, at its upper right-hand corner in Figure 6, the collector link 50 is pivotally mounted for lateral swinging as the trunnion block on its outer end (left-hand end in Figure 6) follows the cable around sheaves 42. Extending from one end of frame 47 are the rods 51 which carry the aforementioned trigger links 52 at their far ends. These rods are gapped at 51a at the places where, when the said trigger links are at the far coupling station, the rods pass over the near coupling station 29a, in order to permit movement of the trigger link cross traversing mechanism at the latter.

Instead of using a separate modulating deflector for the collector of each main rank as shown, it would be possible to drive both from a single deflector, as for example by using a collector in one of the ranks which is a slave to that of the other through appropriate cables. This could be done even if the collectors were required to move oppositely, as in double open space working.

Figure 8A:
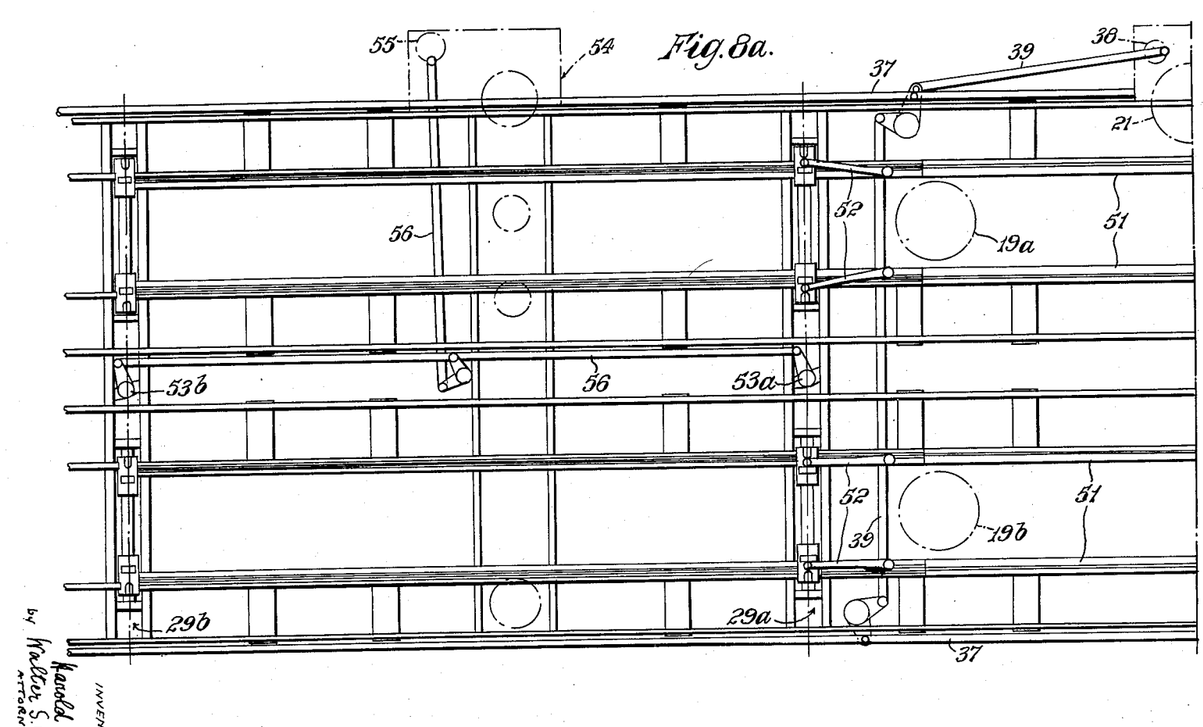
Figures 8a and 8b together form a plan view without the platforms of those parts of the equipment in which the mechanisms for shifting the platforms in the main ranks are accommodated.
Figure 8B:
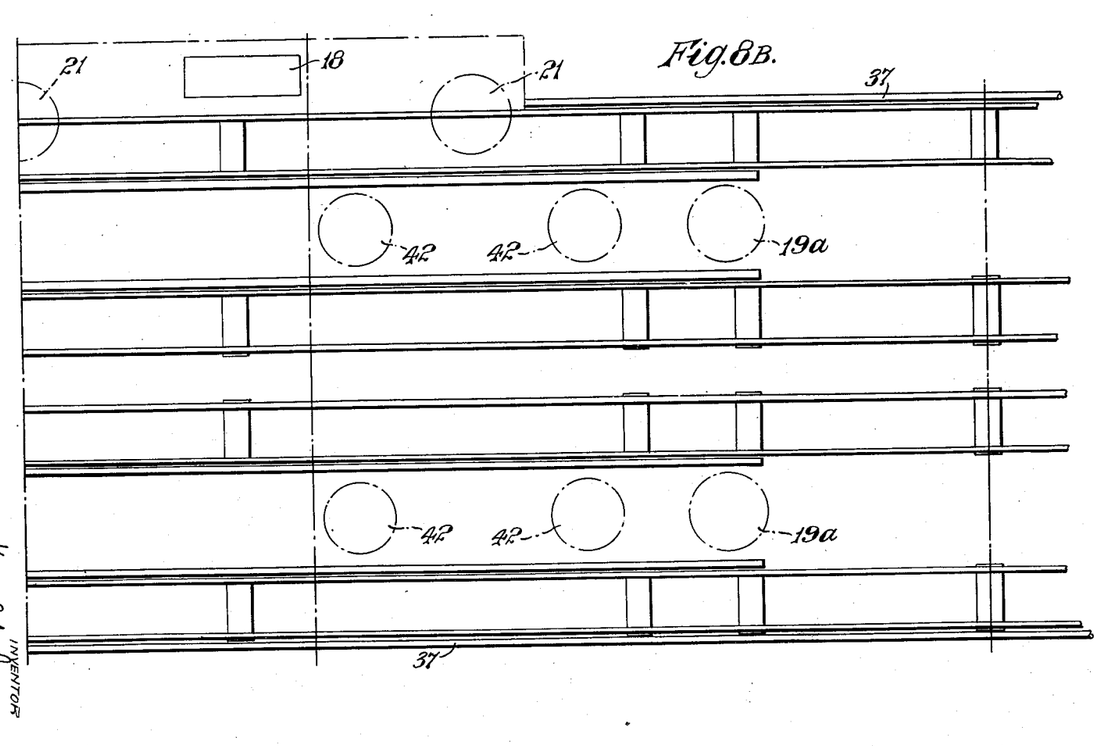

The plan view covered by Figures 8a and 8b is intended chiefly to show the relative positions of the parts of the equipment which have already been, as well as other parts remaining to be described. The sheaves 19a, 19b, 21 and 42 of the rank modulating mechanisms are indicated, the deflectors being at that limiting position in which the trigger links 52 on rods 51 are placed for operation at the near coupling station 29a. The far coupling station 29b is also shown, the means for operating both stations in common appearing to better advantage in Figure 9. The cross traversing mechanism for the trigger links which is used at each of these stations is substantially identical with that set forth in my aforesaid prior specification, but instead of operating them from the side as formerly, I now employ centrally disposed bell cranks 53a and 53b operated from the motor of the transverse modulating mechanism 54 through gearing 55 and linkage 56.

Figure 9:
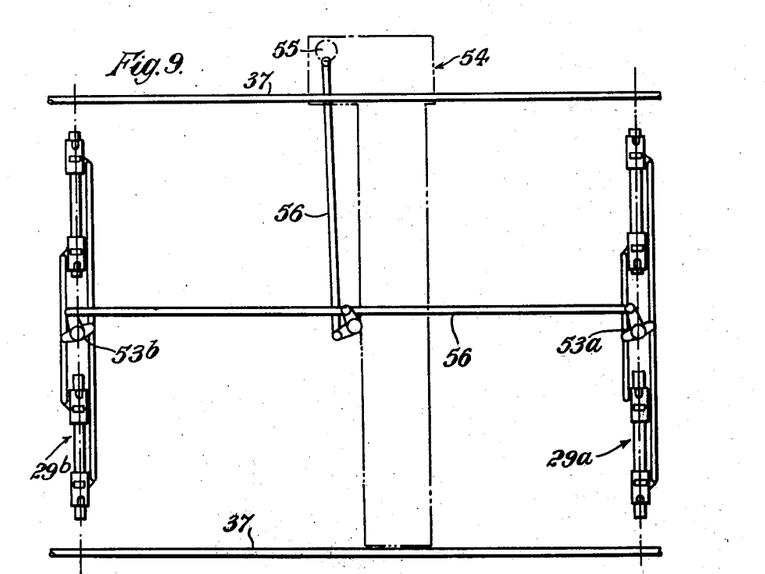
Figure 9 is a plan view corresponding to part of Figure 8a but stripped of the track rails in order to reveal the operating means for the fixed coupling stations.
Figure 10:
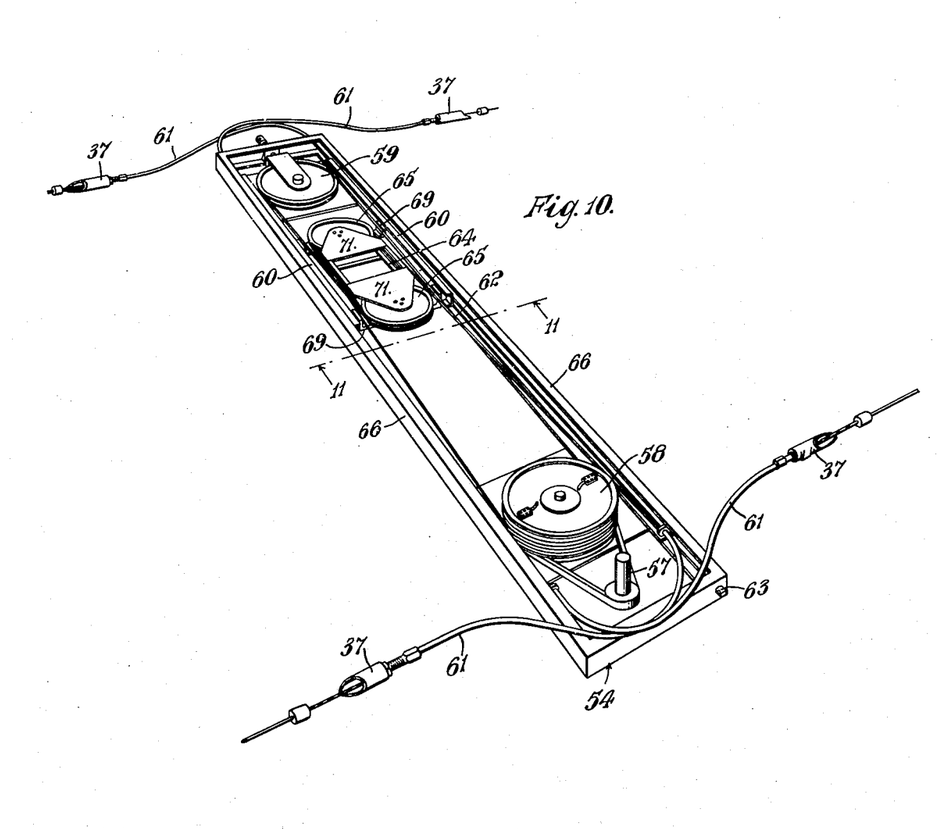
Figure 10 is a perspective view of a modified arrangement of drive modulating mechanism adapted to be disposed transversely of the ranks for the operation, through flexible driving connections, in a manner forming no part of the present invention, of cross-overs for transferring the platforms between the ranks, only the side members of the collector carriage of the mechanism being shown, the pivotal collector link being omitted.
Figure 11:
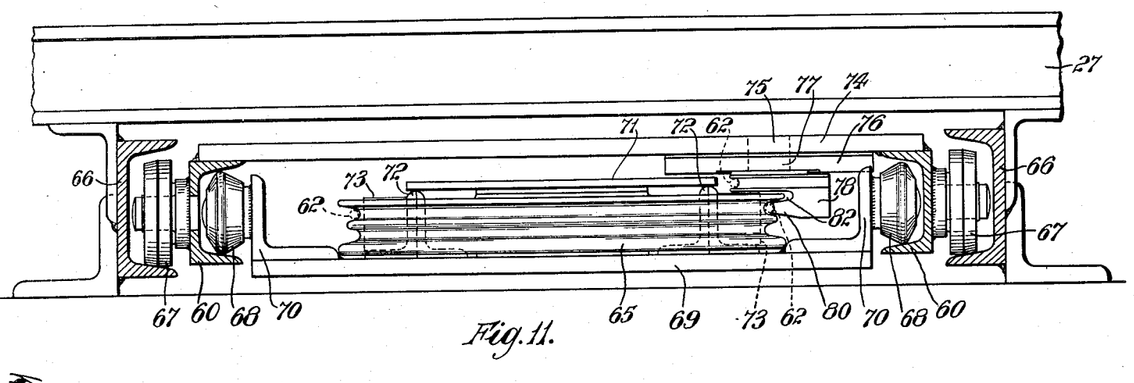
Figure 11 is an enlarged cross-section roughly along the line 11—11 of the assembly of Figure 10 including the missing parts of the latter.

Turning now to the consideration of the transversely disposed modulating mechanism shown in Figures 10 and 11, and indicated at 54 in Figures 8 and 9, it is to be observed that this is essentially an embodiment according to any of Figures 1 to 3 already described, the cable lay-out actually shown in Figure 10 being that of Figure 1. The shaft of the motor is indicated at 57, the drive to the coupling stations being omitted in Figure 10. The fixed centre winding drum is denoted by 58 and the jockey sheave 59 at the far end is mounted adjustably. The collector, of which the side members 60 only appear in Figure 10, is permanently connected by flexible core and reaction sheath cables 61 passing in either direction to traversing means of both the end crossovers through the side tubes 37. The way these cables are connected determines whether the said traversing means moves with or against the collector. As a matter of convenience the term "collector" is retained in relation to this form of the modulating mechanism, even though the load bearing part is permanently connected thereto, since it is, in fact, the part having the required characteristics of motion adapted to be coupled as required to the load. The near end of the metering cable 62 is shown adjustably anchored in the end of the frame 54 at 63. The deflector carriage 64 with its end sheaves 65 does not differ essentially from that of Figure 7. The main feature of interest about the Figure 10 modulating mechanism is its small depth, rendered necessary by the fact that it requires to be accommodated entirely beneath the main track rails 27. The collector carriage cannot therefore move in a plane above that of the deflector carriage, i. e. in the plane of the track rails as in the case of the rank modulator mechanisms. The running rails for both carriages are therefore arranged at the same level, the inwardly facing channel side members 66 of frame 54 serving as the running rails of the collector carriage, the side members 60 of which are provided with the necessary rollers 67 for this purpose. A further pair of fixed running rails for the deflector carriage 64, similar to members 66, could, if desired be provided inside the side members 60 of the collector (the body of which would take the form of a top plate straddling them and the deflector carriage). However a more compact and convenient arrangement is for the inwardly facing channel side members 60 of the collector carriage themselves to constitute the running rails for the rollers 68 of the deflector carriage, these rails 60 being long enough just to accommodate the differential displacement which takes place between them during the course of their travel.

Reference to the sectional view of Figure 11 will make the coplanar disposition beneath the main track rails 27 quite clear. This figure (in which the position of the metering cable 62 in the upper groove of sheave 65 is shown but not the driving cable in the lower groove) shows one of the bottom members 69 of the deflector carriage carrying the near sheave 65 and a pair of the rollers 68 on its upwardly turned side flanges 70. A top plate is shown at 71 supported by side flanges 72 between the sheaves, supporting exteriorly thereof wooden runners 73 like those 46 of Figure 7. In addition to side rails 60, the collector carriage comprises the top plate 74 beneath which is pivoted at 75 the collector link 76 at whose opposite end is pivoted at 77 the trunnion block 78 (described more fully later in relation to Figures 13a–c).

Figures 12, 13A, 13B, 13C:
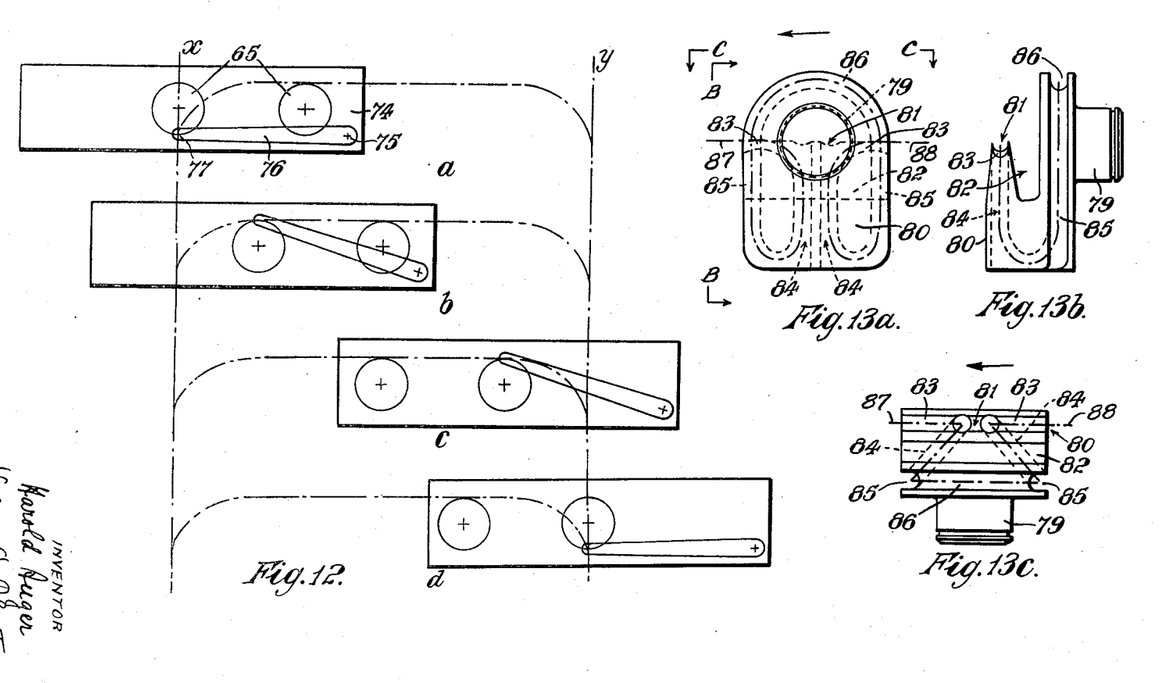

The characteristics of the relative motions of the collector and deflector carriages will be apparent from a consideration of the diagrams a to d of Figure 12. In these the collector carriage is denoted by its top plate 74 and the deflector by its two sheaves 65. The collector link 76 is shown and the position of its pivot points 75 and 77 are indicated. The path traced out by the trunnion block at 77 is also shown between its limiting positions at vertical lines x and y respectively. This series of diagrams clearly shows how the limits of reciprocation of the collector are considerably more widely separated than those of the deflector, the length of the deflector rails 60 needing only to be such as to permit movement of the deflector to the inner ends thereof at either limit. Any moderate overrun of the deflector does not matter, since it merely results in movement of the deflector away from the said inner ends of rails 60 after the collector has become stationary; the outer portions of the deflector rails, which are provided in order to accommodate the differential displacement between the deflector and the collector during their normal displacement, will absorb such overrun. The projection of the collector beyond the limiting positions of the deflector enables the deflector rails 60 to be run out if desired in one or both these limiting positions, on either side of the fixed axis winding drum and/or the jockey sheave to bring these within the embrace of the collector so that no increase in the overall length of the mechanism is involved.

Finally there follows a description of the trunnion block whereby the collector link can be pivotally connected to the metering cable in such a way as to permit it to pass around the flanged sheaves, whilst preserving strict alignment of the pivot with the centre of the cable lying at the bottom of the sheave grooves, as shown in Figure 11. The block is formed with a pin 79 (whereby it is pivotally connected to the collector link) projecting laterally. The block on its opposite side is formed with a hooked projection 80 having a transversely curved and grooved tip 81. The intervening depression 82 is adapted to accommodate the edge rim of the sheave as the block passes around the latter. The cable is continuous (its centre line being shown chain dotted) around and through the block in external grooves 83, internal passages 84 and in external grooves 85 and 86. In this way the axis of the cable leaving both sides of the block is kept in the same plane as that of pin 79, subject to the required flexing of the cable around the sheave which is permitted by the outwardly directed curvature of grooves 83. The part 87 of the cable which is in advance of the block, assuming the block to be moving for the moment in the direction of the arrow in Figures 13a and 13c, may be referred to as the leading portion of the cable, and part 88 as the trailing portion. The imaginary projection of the axis of the cable across the tip 81 and between the leading and trailing parts 87 and 88 of the cable may be called the effective axis of the cable. The tortuous passage of the cable is sufficient to prevent slip and to balance the block about the axis of the pin. The tip 81 is also adapted to ride along the wooden runners 46 or 73 between the sheaves of the deflector carriage.

I claim:

1. Drive mechanism for displacing a load and imparting thereto during at least a portion of said displacement a motion having the characteristics of a projection of substantially cycloidal motion, said mechanism including a driven mobile member, a flexible metering band having a closed loop portion around said mobile member and held extended by the latter, other portions of said band adapted to be fed respectively to and from said loop portion as said mobile member moves, connections from said band to an anchor and to the load, one such connection being located always outside of said loop portion and another such connection including a coupling fixed upon said band at a point thereon which is within said loop portion during at least part of the travel of said mobile member, and projection drive means adapted for movement of said coupling transversely with respect to said load displacement.

2. Drive mechanism for displacing a load, comprising in combination a driven mobile member movable along a first predetermined path and comprising supporting means, a flexible metering band having a closed loop portion around said supporting means and held extended by said latter means for movement in a second predetermined path on said mobile member, other portions of said band adapted to be fed respectively to and from said loop portion as said mobile member moves, connections from said band to an anchor and to the load, one such connection being located always outside of said loop portion and another such connection including a coupling fixed upon said band at a point thereon which is within said loop portion during at least part of the travel of said mobile member, and projection drive means adapted for movement of said coupling transversely with respect to said load displacement, said band and said coupling being constrained to circulate about said supporting means and along said second path as said mobile member moves along said first path.

3. Drive mechanism for displacing a load, comprising in combination a driven mobile deflector movable along a first predetermined path and comprising supporting means, a flexible metering band having a closed loop portion around said supporting means and held extended by said latter means for movement in a second predetermined path on said deflector, other portions of said band adapted to be fed respectively to and from said loop portion as said deflector moves, means on said band located always outside of said loop and connecting said band to an anchor, a coupling fixed upon said band at a point thereon which is within said loop portion during at least part of the travel of said deflector, said band and said coupling being constrained to move about said supporting means and along said second path as said deflector moves along said first path, and means drivably connecting said coupling to the load and adapted to impart thereto a projection of said motion of said coupling.

4. Drive mechanism in accordance with claim 2 in which said second path has a directional component transverse to the direction of said load displacement.

5. Drive mechanism in accordance with claim 3, in which, as said deflector and coupling move in their respective said paths, said coupling traces in space a curve which at least in part is substantially cycloidal.

6. Drive mechanism in accordance with claim 2, in which said supporting means comprises a substantially circular member and said closed loop of said band is wrapped partly around said circular member.

7. Drive mechanism in accordance with claim 2, in which said supporting means is elongated in the direction of said first path.

8. Drive mechanism in accordance with claim 3, in which said deflector comprises a chassis, said supporting means comprises a pair of substantially co-planar members mounted upon said chassis and spaced apart in the direction of said first path, and said closed loop of said band is wrapped partly around the outer peripheries of said co-planar members.

9. Drive mechanism in accordance wtih claim 2, including driving means for said mobile member, said driving means comprising said metering band, a winding drum, and a power source adapted to rotate said drum, and said band being drivenly connected to said drum.

10. Drive mechanism in accordance with claim 3, including driving means for said deflector, said driving means comprising said metering band, a winding drum, a jockey sheave spaced therefrom, and a power source adapted to rotate said drum, said band being drivenly connected to said drum, and said band also being wrapped completely around said deflector at least once and being further wrapped partly around said deflector and wrapped at least partly about the outer periphery of said sheave.

11. Drive mechanism in accordance with claim 2, in which said mobile member comprises a chassis, said supporting means comprises a pair of substantially co-planar sheaves mounted upon said chassis and spaced apart in the direction of said first path, said closed loop of said band is wrapped partly around the outer peripheries of said co-planar sheaves, and said other portions of said metering band are substantially straight-line extensions of one another and are connected to said anchor at points spaced apart by at least a distance equal to (i) the distance between the positions of said coupling which correspond with the terminal positions of the load, less (ii) twice the distance between the centers of said sheaves.

12. Drive mechanism in accordance with claim 2, including means drivably connecting said coupling to the load, said driving means comprising a collector adapted to be drivably connected to the load and disposed substantially parallel with said deflector, and projection drive means drivably connecting said coupling to said collector.

13. Drive mechanism in accordance with claim 3, in which said deflector is substantially horizontally disposed, and which includes means drivably connecting said coupling to the load, said latter means comprising a collector adapted to be drivably connected to the load and substantially horizontally disposed, and projection drive means drivably connecting said coupling to said collector.

14. Drive mechanism in accordance with claim 3, including means drivably connecting said coupling to the load and comprising a collector adapted to be drivably connected to the load and accommodating said deflector within the overall dimensions of said collector, and projection drive means drivably connecting said coupling to said collector.

15. Drive mechanism in accordance with claim 3, including means drivably connecting said coupling to the load and comprising a collector adapted to be drivably connected to the load and accommodating said deflector within the overall dimensions of said collector and comprising a runway for said deflector, and projection drive means drivably connecting said coupling to said collector, said collector and deflector having a differential displacement with respect to each other during movement of the load between its said positions of rest, and said runway having a length at least equal to said differential displacement plus the length of said deflector.

16. Power transmission apparatus including a load, a sheave, a driven flexible band passing over said sheave, and a trunnion block which is fixed to said band by reeving the same along a passage extending through and around said block, said block being bifurcated, one limb thereof overhanging the second, the tip of said second limb being adapted to mate with said sheave, and said band having trailing and leading parts emerging from said second limb and extending therefrom colinearly and in opposite directions.

17. Power transmission apparatus in accordance with claim 16, including a drive pin mounted on said first limb and disposed with its axis perpendicular to and substantially intersecting the projection of the axes of said colinear leading and trailing parts of said band as they extend from said second limb.

18. Power transmission apparatus in accordance with claim 16, in which said sheave has an external flange and said passage extends exteriorly of said first limb and internally of second limb, and the space between said limbs conforms to said flange.

References Cited in the file of this patent

UNITED STATES PATENTS

| Number | Name | Date |
|---|---|---|
| Re. 20,269 | Green | Feb. 16, 1937 |
| 497,706 | Chase et al. | May 16, 1893 |
| 810,941 | Hiss et al. | Jan. 30, 1906 |
| 1,053,564 | Boesner | Feb. 18, 1913 |
| 1,715,056 | Clark | May 28, 1929 |
| 2,130,040 | Siler | Sept. 13, 1938 |
| 2,185,079 | Hall | Dec. 26, 1939 |
| 2,201,939 | Auger et al. | May 21, 1940 |
| 2,216,637 | Auger | Oct. 1, 1940 |
| 2,258,530 | Auger | Oct. 7, 1941 |